UNITED STATES PATENT OFFICE.

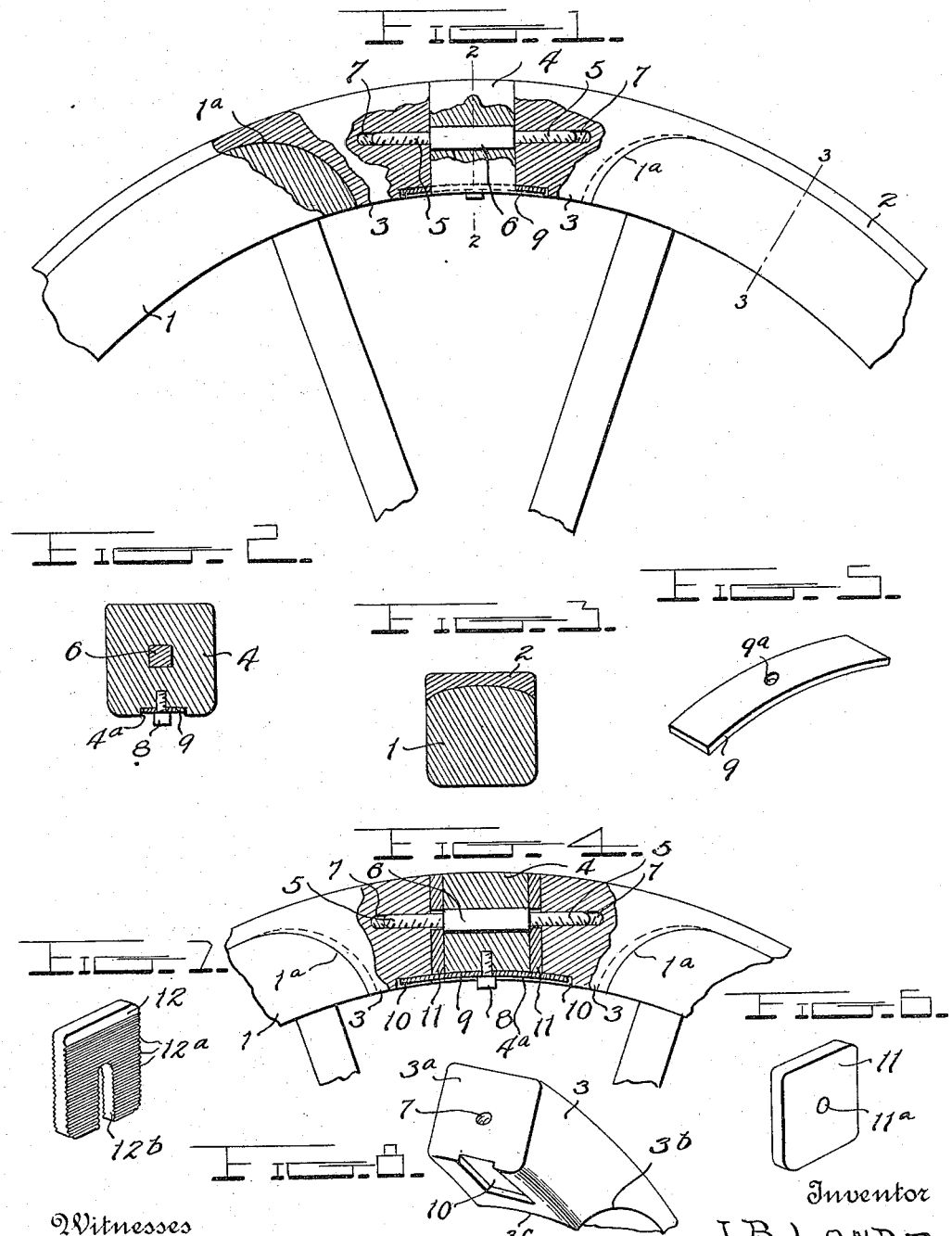

JOSEPH B. LAND, OF NEW POINT, INDIANA.

TIRE-TIGHTENER.

1,167,358.

Specification of Letters Patent.

Patented Jan. 4, 1916.

Application filed June 6, 1914. Serial No. 843,443.

*To all whom it may concern:*

Be it known that I, JOSEPH B. LAND, a citizen of the United States, residing at New Point, in the county of Decatur and State of Indiana, have invented certain new and useful Improvements in Tire-Tighteners, of which the following is a specification.

The present invention relates to certain new and useful improvements in metallic tires for vehicle wheels, and has for its object to provide a device of this character which embodies novel features of construction whereby the tire can be quickly tightened or loosened upon the rim at any time without the use of special tools, thereby enabling proper adjustment to be made so that the wheel will not dish in wet weather or become loose in dry weather.

A further object of the invention is to provide a device of this character which is comparatively simple and inexpensive in its construction, which is so designed as to entirely eliminate the necessity for using tire bolts, which enables the tire to be quickly removed for the purpose of putting in new spokes and the like, and which can be readily locked so as to remain in any adjusted position.

With these and other objects in view, the invention consists in certain novel combinations and arrangements of the parts as will more fully appear as the description proceeds, the novel features thereof being pointed out in the appended claim.

For a full understanding of the invention, reference is to be had to the following description, and accompanying drawing, in which:—

Figure 1 is a side elevation of a portion of a wheel provided with a tire constructed in accordance with the invention, portions being broken away and shown in section. Fig. 2 is a transverse sectional view on the line 2—2 of Fig. 1. Fig. 3 is a transverse sectional view on the line 3—3 of Fig. 1. Fig. 4 is a view similar to Fig. 1, showing a pair of filling members or wedges as employed in connection with the key block. Fig. 5 is a detail perspective view of the locking spring. Fig. 6 is a similar view of one form of filling member or wedge. Fig. 7 is a similar view of another form of filling member or wedge. Fig. 8 is a detail perspective view of the head at one end of the tire.

Corresponding and like parts are referred to in the following description and indicated in all the views of the drawing by the same reference characters.

Specifically describing the present embodiment of the invention, the numeral 1 designates a wheel rim which has a split or break therein, the ends of the rim at the split portion thereof being rounded as indicated at 1$^a$. A metallic tire 2 extends around the periphery of the rim 1 and also has a split or break therein. The ends of the tire 2 terminate in the enlarged heads 3 which are offset on the inner sides thereof and have the opposed square faces 3$^a$ which are radially disposed with respect to the wheel. The enlarged heads 3 have the rear faces thereof curved at 3$^b$ in a manner corresponding to the curved ends 1$^a$ of the rim 1 so as to engage and fit tightly against the same. It will also be observed that the cross section of the heads 3 is the same as the combined cross section of the rim 1 and tire 2, so that to a casual observer the rim and tire are continuous. The outer surface of the rim 1 is convexed in transverse section, while the inner surface of the tire 2 is correspondingly concaved in cross section, as indicated by Fig. 3. This channel or concaved formation of the tire 2 admits of the same being applied to the rim 1 and clamped securely in position thereon without the necessity of using any tire bolts. The curved inner faces 3$^b$ of the enlarged heads 3 are also slightly recessed at 3$^c$ to receive the ends 1$^a$ of the rim 1 and hold the said ends of the rim securely in position.

A block 4 is interposed between the opposed radial faces 3$^a$ of the two heads 3 and has a cross section exactly corresponding to the cross section of the said head 3 so as to fill in the space between the two heads and provide a substantially continuous surface on all sides thereof. Extending longitudinally through the key block 4 is a bolt 5, the ends of the bolt projecting from opposite ends of the block and being provided with right and left hand threads respectively. The middle portion of the bolt 5 is anchored in the key block 4 so that the bolt will always turn when the key block is rotated, and for this purpose the said bolt is shown as formed with a polygonal enlargement 6 which is embedded in the key block. The opposite ends of the bolt 5 are received within correspondingly threaded recesses 7 in the enlarged heads 3 so that when the key block 4 is given a turn in one direction the tire is tightened, while when the key block is given a turn in the other direction the tire is loosened.

It is contemplated to employ suitable locking means for holding the key block 4 in an adjusted position, and for this purpose a locking strip 9, shown in detail in Fig. 5, is provided. A square headed screw or bolt 8 passes through a central opening 9$^a$ in the locking strip 9 to secure the locking strip to the key block 4. The side of the key-block 4 is recessed at 4$^a$ to receive the locking strip 9 when the latter is in operative position and the enlarged heads 3 are formed with sockets or recesses 10 adapted to receive the ends of the locking strip 9. It will thus be obvious that when the locking strip 9 is retained in operative position by the bolt 8, the key block 4 is held securely against rotation and the tire maintained in an adjusted position. However, when it is desired to rotate the key block 4 to tighten or loosen the tire, this can be readily done by first unscrewing the bolt 8 a sufficient amount to admit of the locking strip 9 being withdrawn from the recess 4$^a$ of the key-block 4 and the sockets or recesses 10 of the enlarged heads 3.

Occasions may arise in which spaces will remain between the key-block 4 and the radial faces 3$^a$ of the enlarged heads 3, and in order to prevent the accumulation of mud and dirt within these spaces, filling members or wedges 11 may be provided. These filling members may be formed of any suitable material, although they are preferably formed of a slightly elastic material so that they will tend to adjust themselves to the size of the space. As indicated by Fig. 6, the filling member 11 has a central opening 11$^a$ to receive the locking bolt 5 and hold it in position. In Fig. 7 a modified form of filling member or wedge is shown, said wedge being indicated by the numeral 12 and having the faces thereof provided with transverse serrations 12$^a$, while the base thereof is formed with a slot 12$^b$ adapted to receive and straddle the bolt 5 so that the filling member can be inserted in position without entirely disengaging the bolt from the enlarged head 3. After the filling member 12 has been inserted in position, the bolt 5 is tightened and the transverse serrations or teeth 12$^a$ then bite into and engage the opposed surfaces with which they are brought into contact so as to hold the filling member or wedge securely in position.

Having thus described the invention, what I claim as new and desire to secure by Letters Patent, is:—

A device of the character described including a split wheel rim, a tire applied to the rim and having a corresponding break therein, said tire being formed with enlarged heads which engage the ends of the rim and have substantially the same cross section as the combined tire and rim, said enlarged heads being provided in the opposed faces thereof with threaded openings arranged in alinement with each other and being also provided upon corresponding sides thereof with recesses, a key block interposed between the heads of the tire and having substantially the same cross section as the same, a locking bolt extending through the key block and projecting from opposite sides thereof, the ends of the locking bolt having a threaded engagement with the before mentioned openings of the heads of the tire, a spring strip terminating at its opposite ends in noses adapted to engage the recesses of the heads, and a screw adjustably securing the middle portion of the spring strip to the key block so that by loosening the screw the spring strip can be disengaged from the recesses of the heads preparatory to rotating the key block.

In testimony whereof I affix my signature in presence of two witnesses.

JOSEPH B. LAND.

Witnesses:
H. S. McKEE,
H. M. LOYD.